May 30, 1950  E. A. ROCKWELL  2,509,840
DIAPHRAGM POWER UNIT
Original Filed July 3, 1940  3 Sheets-Sheet 1
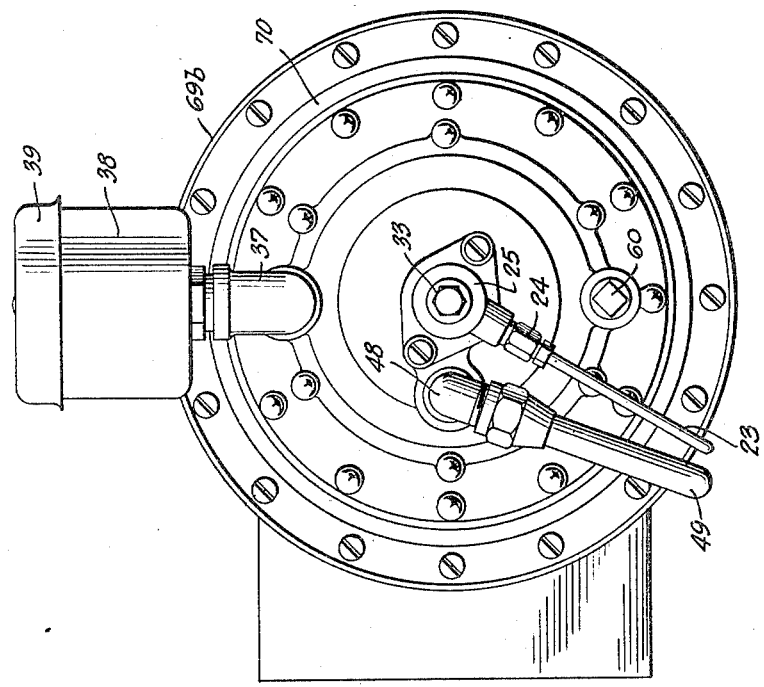
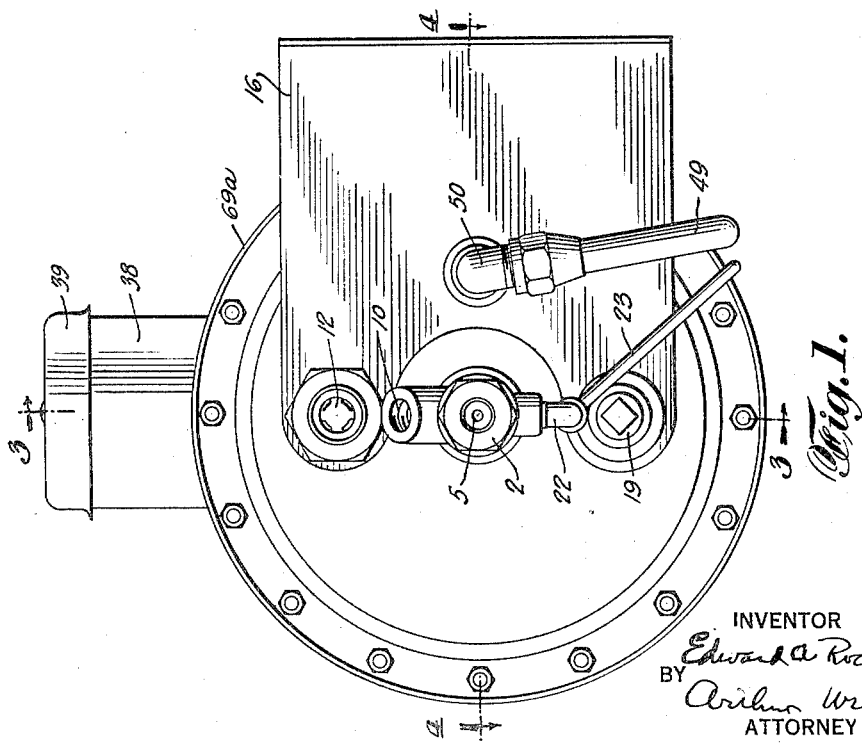
INVENTOR
Edward A. Rockwell
BY Arthur Wright
ATTORNEY May 30, 1950      E. A. ROCKWELL      2,509,840
DIAPHRAGM POWER UNIT Original Filed July 3, 1940      3 Sheets-Sheet 2

INVENTOR
Edward A. Rockwell
BY Arthur Wright
ATTORNEY

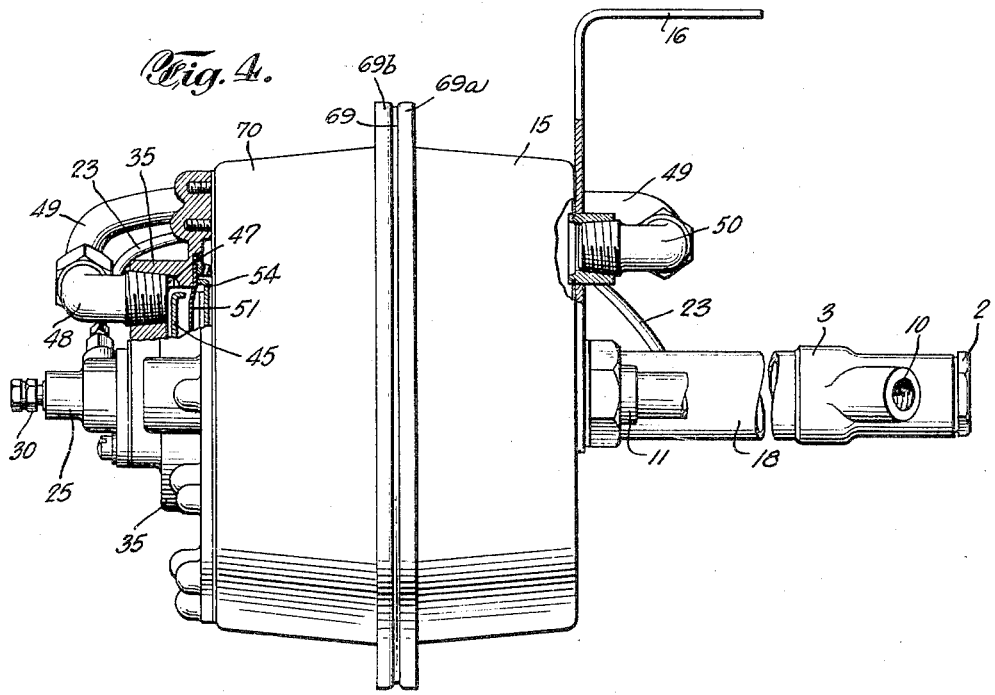

Patented May 30, 1950

2,509,840

UNITED STATES PATENT OFFICE 2,509,840

DIAPHRAGM POWER UNIT

Edward A. Rockwell, Cleveland, Ohio

Original application July 3, 1940, Serial No. 343,754, now Patent No. 2,382,444, dated August 14, 1945. Divided and this application April 6, 1944, Serial No. 529,867

6 Claims. (Cl. 60—54.6)

My invention relates particularly to an apparatus designed to be used as a power unit and which is applicable for applying power to any desired purpose, but especially in connection with automotive vehicles, such for instance as accessories, in the operation of automobiles.

The present application is a division of my co-pending application upon Power unit apparatus, Ser. No. 343,754, filed July 3, 1940, Patent No. 2,382,444, granted August 14, 1945.

The object of my invention is to provide a power unit of an advantageous character, for the operation of automotive vehicles and the accessories thereon and in fact wherever power is to be applied. One of the objects of my invention is to simplify the construction of such power units. Another object is to provide an improved form of apparatus for the operation of accessories, especially in regard to the follow-through or direct manual actuation thereof. Still another object is to provide means for eliminating, if desired, the piston and cylinder form of delivery of the power from the power unit to the accessories. Again, a further object is to reduce the size of the unit by providing an improved way of applying a pressure medium differing from the atmospheric pressure for the actuation of the parts which deliver the power to the accessories. Further objects of my invention will appear from the detailed description of the same hereinafter.

While my invention is capable of embodiment in many different forms, for the purpose of illustration I have shown only certain forms of the same in the accompanying drawings in which—

Fig. 1 is an end elevation of my invention;

Fig. 2 is an elevation of the other end thereof;

Fig. 4 is a plan view, partly in section, taken on line 4—4 of Fig. 1.

Figure 3:
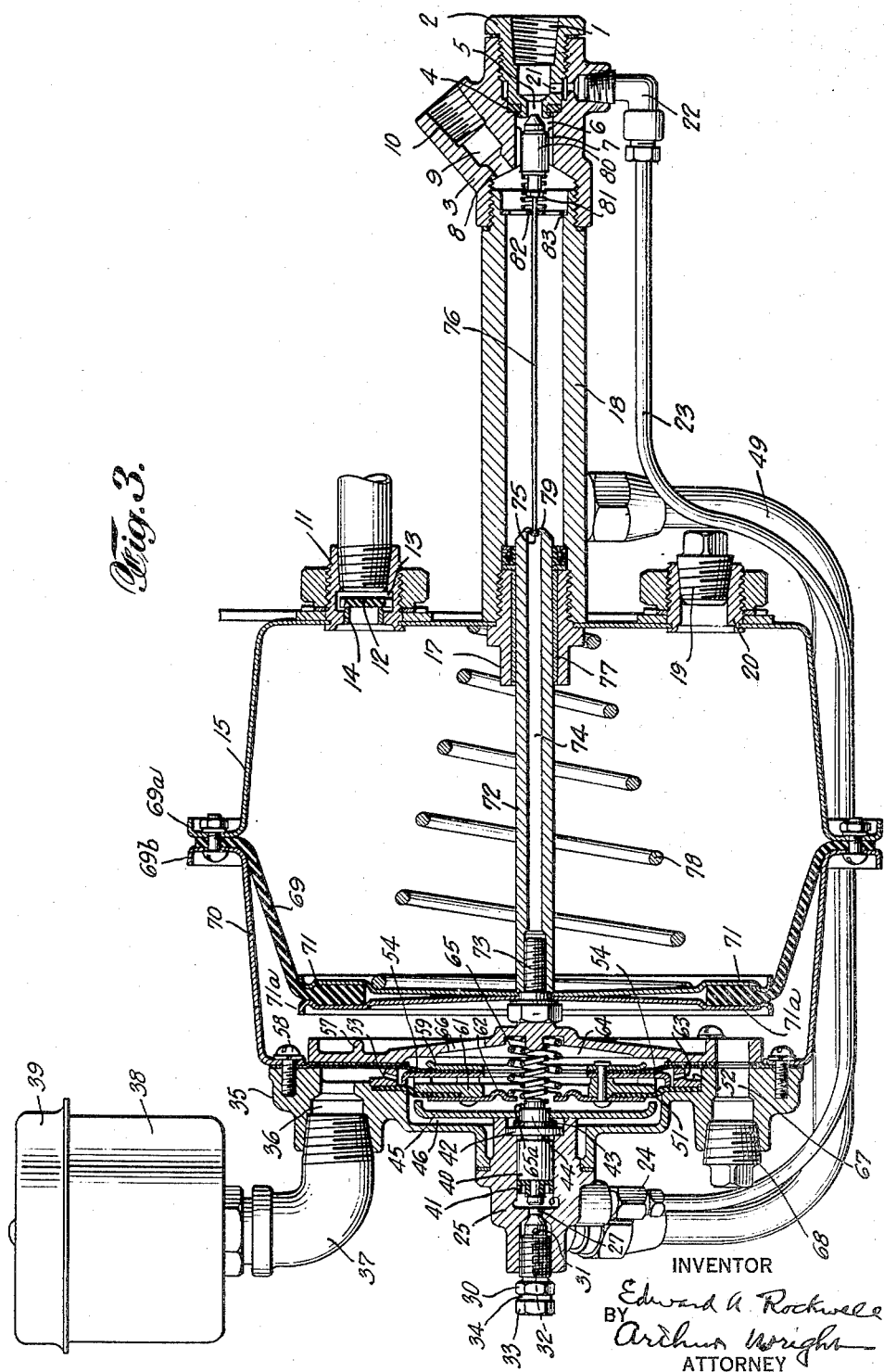
Fig. 3 is a vertical section taken on line 3—3 of Fig. 1.

When a pedal of the usual kind (not shown) is moved downwardly, a piston is adapted to discharge the liquid of a master cylinder (not shown) to an inlet opening 1 located in a removable fitting 2 screw-threaded in a casting 3 at one end of the power unit. The fitting 2 carries on its inner face a rubber seal 4 and the liquid from the fitting is conveyed by a port 5 therein to a valve passageway 6 having a plurality of longitudinal channels 7 therein so as to communicate with a chamber 8 in said casting and thence initially to convey the liquid under manual pressure by a passageway 9 to an outlet port 10 which serves the purpose of delivering modulated hydraulic pressure liquid manually, or from the power apparatus hereinafter described, to the accessory or part to be operated, as for instance the wheel brakes of the automobile having the usual wheel brake cylinders (not shown) for operating the brake shoes, for example as disclosed in my application aforesaid.

At one side of the casting 3 there is provided a vacuum inlet fitting 11 which contains a check valve 12, within a valve chamber 13, adapted to seat against a bushing 14 carried in the fitting 11, fastened within a rear dished casing 15. The fitting 11 also serves to support the power unit by passing through an automobile bracket 16, and being externally screw-threaded to receive a nut. The rear shell casing 15, furthermore, has a central tubular fitting 17 which is screw-threaded to a power cylinder 18, to the other end of which the casting 3 is screw-threaded. In this way the vacuum, as for example from the engine manifold or any other desired source, is supplied to the interior of the rear casing 15. Adjacent to the vacuum inlet fitting 11 there is a screw plug 19 screw-threaded into a cylindrical fitting 20 constructed exactly like the fitting 11 except that the valve seat and valve are omitted, this fitting 20 being provided to supply vacuum for a trailer connection or any other desired purpose.

The hydraulic liquid received from the master cylinder also passes from the inlet opening through a passageway 21 in the casting 3 and thence by an angle joint 22 and a pipe 23 into an angular pipe 24 leading into the side of a plunger housing 25 so as to communicate with a chamber 26 therein. The said chamber 26 also communicates with a passageway 27 adjacent to a valve seat 28 provided for receiving a conical end 29 of a bleeder valve 30 screw-threaded into the plunger housing 25. A plurality of transverse ports 31 extend through the reduced end of the bleeder valve 30 so as to communicate with a longitudinal passageway 32 in the bleeder valve, which is normally closed by a screw-plug 33 held in position by a lock washer 34. When the plug 33 is removed and the valve 30 unscrewed to unseat the bleeder valve, the accumulated air is relieved through the passageway 32. The said plunger housing 25 supports in place a valve casing 35, the periphery of which has an air port 36, connected by a pipe 37 to an air filter 38 having horse hair therein and covered, except at the margin, with a flared cover 39.

The hydraulic liquid in the chamber 26 thus communicates with one face of a cylindrical plunger 40 having a rubber seal 41 on a reduced end thereof. The plunger 40 may be made in any desired size so as to be capable of being substituted in the apparatus with an appropriate size of plunger housing 25 so that by the increase in the area of the plunger 40 the power unit can be adapted to the operation of larger and heavier vehicles, such as trucks, in which a large volume of liquid is required for operating the wheel brakes thereon. The other end of the plunger 40 carries a washer 42 and a gasket 43 adjacent to a reduced end 44 thereon.

It will be noted that the plunger housing 25 fits within and is fastened to the valve casing 35 and one end of the plunger housing 25 acts as a stop or support for an outlet valve 45 which is attached to the reduced end 44 of said plunger 40. The outlet valve 45 is arranged for movement within a chamber 46 in the valve casing 35, which communicates with a passageway 47 in the valve casing 35 having an angle pipe fitting 48 leading to a vacuum pipe 49 having an angle pipe fitting 50 passing through the bracket 16 into the rear casing 15, thus giving access of the vacuum within the shell 15 to the outlet valve chamber 46. When the plunger 40 is moved forwardly by the liquid in the chamber 26 this causes the outlet valve 45 to seat against a diaphragm 51 of rubber or other suitable material, which is clamped at its periphery against one face of the valve casing 35 by a ring 52 having ports 53 therein. These ports 53 permit the passage of atmospheric air pressure to be received in the apparatus from the passageway 36 which communicates with the chamber 38 filled with horse-hair and which is open to the air through the periphery of the cover 39 spaced from the filter 38, as shown in Fig. 3.

This atmospheric air is adapted, when the outlet valve 45 is seated, to enter beneath the periphery of an inlet valve 54 which is normally seated on one face of the said diaphragm 51. This inlet valve 54 is supported on the inner periphery of a thin oxidized oil woven fabric ring 55 backed by a paper gasket 56, which latter is held in position against one face of the valve casing 35 by means of a clamping plate 57 and screws 58. Furthermore, the said inlet valve 54 is clamped in position on the ring 55 by a clamping ring 59 and rivets 60 which pass not only through the inlet valve 54 but also through a ring 61 and a spring-supporting ring 62 which is clamped thereby against one face of the diaphragm 51.

It will be noted, also, that there are passageways 63 which pass radially from the outer portion of the inlet valve 54 inwardly to the inside of the ring 61 so as to communicate with a chamber 64 located beneath the outlet valve 45. In this chamber 64 there is a spring 65 supported at one end upon the ring 62 and at the other end upon the clamping plate 57 to normally force the inlet valve 54 to the left in Fig. 3. Also, within the chamber 64 there is an inner spring 65a, one end of which is seated on the said clamping plate 57 and the other end of which surrounds a small extension on the end of the plunger 40. The clamping plate 56 has perforations 66 through the same to permit the passage of the vacuum or air received in the chamber 64.

Also passing through the clamping ring 57 and the valve casing 35 there is a passageway 67 closed by a screw plug 68 for supplying modulated pressure for a trailer connection.

When the outlet valve 45 has been closed and the inlet valve 54 opened, the pressure of the atmospheric air is then received on one face of a movable wall or diaphragm 69, of rubber or other flexible material, so as to move the same.

This diaphragm 69, at its outer periphery, is clamped by screws between a flange 69a on the casing 15 and a flange 69b on a front shell casing 70 fastened by the screws 58 to the valve casing 35. Also, the diaphragm 69 carries on the rear face a clamping plate 71. On the other face of the diaphragm 69 there is a diaphragm clamping plate 71a. Each of the said plates 70 and 71 has a circular hole to receive a sealed plunger 72 on which both of the plates 71a and 71 are fastened by a screw 73.

Within the plunger 72 there is provided a longitudinal passageway 74 for receiving a flanged end 75 of a rod 76 of small diameter, and said plunger 72 is supported for reciprocation within a bushing 77 located in the cylindrical fitting 17 screw-threaded into the power cylinder 18, which latter carries the rear shell casing 15, to act as a support for a helical spring 78, the other end of which is supported on the face of the plate 71. This spring is made stiff enough so that the diaphragm 69 will not be moved until the brake shoes have been moved into position manually, even though the valve 54 may have admitted some air.

Within the end of the piston 72 there is an annular shoulder 79, so that when the piston 72 is moved to the extreme left, in Fig. 3, the shoulder 79 contacts with the flange 75 so as to pull a valve member 80, screw-threaded to the other end of the rod 76, off its seat on the inlet fitting 2. A spring 81 around a reduced end of the valve 80, and which is supported at the other end of the spring upon a spider 82 carried on a shoulder 83 in the cylinder 18, serves to hold the spring 81 in position in the assembly of the parts so that it normally forces the valve 80 against its seat when not pulled away from the seat by the shoulder 79.

In the operation of the apparatus, when the pedal is moved downwardly the liquid from the master cylinder is conveyed to the inlet 1 and, the valve 80 being open because of having been withdrawn by the shoulder 79 pulling the rod 76 to the left, the said liquid passes through the channels 7 around the valve 80 and thence is conveyed through the outlet port 10 to the brake cylinders of the wheel brakes, thus enabling them to be operated manually to move the brake shoes initially into snugly fitting position for the subsequent application of the power from the power unit to produce the braking force, or in the case of the failure of the power unit, then manually by forcing a further amount of the liquid through the outlet port 10.

Assuming that the brake shoes have thus been moved manually into position preparatory to further applying the braking force, the liquid, which has also simultaneously been conveyed by the passageway 5, pipe 22 and pipe 23 to the chamber 26, upon receiving increased manual pressure will force the plunger 40 to the right, thus seating the outlet valve 45 and then unseating the inlet valve 50 so as to admit atmospheric pressure from beneath the cover 39, passageway 36 and holes 53 beneath the inlet valve 54 and thus breaking the vacuum which is on the left of the diaphragm 69, in Fig. 3. Prior to this, it will be understood that the vacuum has been present on both sides of the diaphragm 69.

Upon the application of the atmospheric air pressure to the left face of said diaphragm 69, the latter will be forced to the right against the opposition of the spring 78, thus releasing the shoulder 79 from the flange 75 and permitting the valve 6 to seat against the inlet fitting 2. The supply of the manual hydraulic pressure liquid is thus cut off from the passageways 7 and from the inlet opening 9 leading to the brakes, and further manual pressure thereafter proceeds only through the succession of passageways beginning with the passageway 21, so as to further admit or cut off, as desired, the atmospheric air pressure to the left face of the diaphragm 69 and supplying the coordinate pressure thus produced, which is greatly magnified due to the small size of the plunger 72 compared to the diameter of the diaphragm 69, through the outlet port 10 to the wheel brakes. In this way modulated pressure coordinated to the reaction thereof on the foot is applied to provide the braking force to the vehicle wheels.

The pressures thus applied to produce the braking force on the brakes can be lessened in the off modulation of the brakes similarly by a release, to the extent desired, of the manual pressure applied for causing the diaphragm 69 to be moved by the atmospheric air pressure, and thus at all times, both in the on and off modulation, the degree of the braking force can be carefully and minutely coordinated to the reaction force on the foot giving a nicety of control at all times, which can be regulated by the feel of the reaction pressures on the foot.

Of course, when the desired braking pressure is attained at any particular time the diaphragm 69 is held at this particular position as the inlet valve 45 will become seated to trap the atmospheric pressure in the unit to the extent to which it has been admitted and of course if further release of the said atmospheric pressure is desired, this is accomplished by permitting the outlet valve 54 to open for the release of the pressure as desired.

The apparatus can be readily adapted to the operation of larger vehicles or trucks, as desired, by using larger plungers 40 as well as the larger plunger housings with larger master cylinder pistons to give a greater volume of liquid for the actuation of the parts, while substantially maintaining the same ratio of the force applied by the plunger 72 as compared with the force delivered by the diaphragm 69.

This diaphragm form of the invention can be used where less reserve is needed, as for instance on smaller vehicles.

While I have described my invention above in detail I wish it to be understood that many changes may be made therein without departing from the spirit of the same.

I claim:

1. In combination, a movable flexible wall, manual means for controlling the same, a spring for retracting said wall, a plunger connected to the movable wall, a valve having a lost-motion connection to the plunger, an inlet for hydraulic fluid controlled by said valve according to the position of said plunger, an outlet for liquid under pressure, produced by said wall, and a sectional enclosure containing two concentric sections for the movable wall and plunger clamping the wall in position between said sections and forming a variable pressure chamber in which the movable wall reciprocates according to the variation of the pressure in said chamber, said enclosure carrying a valve seat for said valve and said enclosure having a vacuum inlet on one side of said wall to maintain constantly a vacuum on said side of the wall, a vent on the enclosure on the other side of the movable wall, vacuum valve means on the other side of said wall, and a vacuum pipe containing a constant vacuum therein passing outside said sectional container and connecting one of said sections to another on opposite sides of the movable wall.

2. In combination, a movable flexible wall, manual means for controlling the same, a spring for retracting said wall, a plunger connected to the movable wall, a valve having a lost-motion connection to the plunger, an inlet for hydraulic fluid controlled by said valve according to the position of said plunger, an outlet for liquid under pressure produced by said wall, and a sectional enclosure containing two concentric sections for the movable wall and plunger clamping the wall in position between said sections and forming a variable pressure chamber in which the movable wall reciprocates according to the variation of the pressure in said chamber, said enclosure having a tubular extension for said plunger, said enclosure carrying a valve seat for said valve and said enclosure having a vacuum inlet on one side of said wall to maintain constantly a vacuum on said side of the wall, a vent on the enclosure on the other side of the movable wall, a head for said sectional enclosure containing a vacuum valve means on said other side of said wall and a vacuum pipe containing a constant vacuum therein passing outside said sectional container and connecting one of said sections to another on opposite sides of the movable wall.

3. In combination, a movable flexible wall, manual means for controlling the same, a spring for retracting said wall, a plunger connected to the movable wall, a valve having a lost-motion connection to the plunger, an inlet for hydraulic fluid controlled by said valve according to the position of said plunger, an outlet for liquid under pressure produced by said wall, and a sectional enclosure containing two concentric sections for the movable wall and plunger clamping the wall in position between said sections and forming a variable pressure chamber in which the movable wall reciprocates according to the variation of the pressure in said chamber, said enclosure carrying a removable tubular plug having therein a valve seat for said valve and said enclosure having a vacuum inlet on one side of said wall to maintain constantly a vacuum on said side of the wall, a vent on the enclosure on the other side of the movable wall, vacuum valve means on the other side of said wall and a vacuum pipe containing a constant vacuum therein passing outside said sectional container and connecting one of said sections to another on opposite sides of the movable wall.

4. In combination, a movable flexible wall, manual means for controlling the same, a spring for retracting said wall, a plunger connected to the movable wall, a valve having a lost-motion connection to the plunger, an inlet for hydraulic fluid controlled by said valve according to the position of said plunger, an outlet for liquid under pressure produced by said wall, and an enclosure containing two concentric sections for the movable wall and plunger clamping the wall in position between said sections and forming a variable pressure chamber in which the movable wall reciprocates according to the variation of the pressure in said chamber, said enclosure having a tubular extension for said plunger, said enclosure carrying a removable tubular plug having therein a valve seat for said valve and said enclosure having a vacuum inlet on one side of said wall to maintain constantly a vacuum on said side of the wall, a vent on the enclosure on the other side of the movable wall, vacuum valve means on the other side of said wall and a vacuum pipe containing a constant vacuum therein passing outside said sectional container and connecting one of said sections to another on opposite sides of the movable wall.

5. In combination, a movable flexible wall, manual means for controlling the same, a spring for retracting said wall, a plunger connected to the movable wall, a valve having a lost-motion connection to the plunger, an inlet for hydraulic fluid controlled by said valve according to the position of said plunger, an outlet for liquid under pressure produced by said wall, an enclosure containing two concentric sections for the movable wall and plunger clamping the wall in position between said sections and forming a variable pressure chamber in which the movable wall reciprocates according to the variation of the pressure in said chamber, said enclosure having a tubular extension for said plunger, said enclosure carrying a valve seat for said valve, and a spring supported by said tubular extension tending to seat said valve and said enclosure having a vacuum inlet on one side of said wall to maintain constantly a vacuum on said side of the wall, a vent on the enclosure on the other side of the movable wall, vacuum valve means on the other side of said wall and a vacuum pipe containing a constant vacuum therein passing outside said sectional container and connecting one of said sections to another on opposite sides of the movable wall.

6. In combination, a movable flexible wall, manual means for controlling the same, a spring for retracting said wall, a plunger connected to the movable wall, a valve having a lost-motion connection to the plunger, an inlet for hydraulic fluid controlled by said valve according to the position of said plunger, an outlet for liquid under pressure produced by said wall, an enclosure containing two concentric sections for the movable wall and plunger clamping the wall in position between said sections and forming a variable pressure chamber in which the movable wall reciprocates according to the variation of the pressure in said chamber, said enclosure having a tubular extension for said plunger, said enclosure carrying a removable tubular plug having therein a valve seat for said valve, and a spring supported by said tubular extension tending to seat said valve and said enclosure having a vacuum inlet on one side of said wall to maintain constantly a vacuum on said side of the wall, a vent on the enclosure on the other side of the movable wall, vacuum valve means on the other side of said wall and a vacuum pipe containing a constant vacuum therein passing outside said sectional container and connecting one of said sections to another on opposite sides of the movable wall.

EDWARD A. ROCKWELL.

REFERENCES CITED

The following references are of record in the file of this patent:

UNITED STATES PATENTS

| Number | Name | Date |
| --- | --- | --- |
| 791,075 | Carpenter | May 30, 1905 |
| 1,550,089 | Mattingly | Aug. 18, 1925 |
| 1,847,604 | Finsen | Mar. 1, 1932 |
| 1,887,880 | Avery | Nov. 15, 1932 |
| 1,962,857 | Cash | June 12, 1934 |
| 2,018,843 | Folberth | Oct. 29, 1935 |
| 2,032,185 | Sciaky | Feb. 25, 1936 |
| 2,197,075 | Fitzgerald | Apr. 16, 1940 |
| 2,260,490 | Stelzer | Oct. 28, 1941 |
| 2,260,492 | Stelzer | Oct. 28, 1941 |
| 2,289,043 | Rockwell | July 7, 1942 |

FOREIGN PATENTS

| Number | Country | Date |
| --- | --- | --- |
| 769,257 | France | June 5, 1934 |